US006641085B1

(12) United States Patent
Delea et al.

(10) Patent No.: US 6,641,085 B1
(45) Date of Patent: Nov. 4, 2003

(54) SELF-CENTERING STEERING MODULE

(75) Inventors: James F Delea, Doylestown, PA (US);
Larry R London, Lansdale, PA (US);
Harry W Hartman, Harleyville, PA (US)

(73) Assignee: Triumph Brands, Inc., Wayne, PA (US)

( * ) Notice: Subject to any disclaimer, the term of this patent is extended or adjusted under 35 U.S.C. 154(b) by 0 days.

(21) Appl. No.: 10/265,019

(22) Filed: Oct. 4, 2002

(51) Int. Cl.[7] ............................................. B64C 25/50
(52) U.S. Cl. ...................... 244/50; 244/103 R; 74/485
(58) Field of Search ................... 244/50, 103 R, 244/104 R, 104 CS; 280/92, 776; 74/485

(56) References Cited

U.S. PATENT DOCUMENTS

| 2,614,777 | A |   | 10/1952 | Shawbrook et al. |   |
|---|---|---|---|---|---|
| 2,626,116 | A |   | 1/1953 | Steuby |   |
| 2,661,915 | A |   | 12/1953 | O'Connor |   |
| 2,770,832 | A |   | 11/1956 | Martin |   |
| 2,958,481 | A |   | 11/1960 | Price |   |
| 3,099,424 | A |   | 7/1963 | Hrusch |   |
| 3,352,515 | A |   | 11/1967 | Albright |   |
| 3,446,459 | A |   | 5/1969 | Smith et al. |   |
| 4,221,350 | A | * | 9/1980 | Moser et al. | 244/50 |
| 4,730,788 | A |   | 3/1988 | Metcalf et al. |   |
| 4,748,392 | A | * | 5/1988 | Goicoechea | 318/611 |
| 5,333,816 | A | * | 8/1994 | Del Monte | 244/50 |
| 6,123,292 | A | * | 9/2000 | Ralph | 244/50 |

* cited by examiner

*Primary Examiner*—Robert P. Swiatek
(74) *Attorney, Agent, or Firm*—Dann Dorfman Herrell & Skillman, P.C.

(57) ABSTRACT

An apparatus for steering a nosewheel on an aircraft, or the like, while the aircraft is on the ground. The apparatus includes a steering shaft that engages a cluster of gears and transfers torque from a steering command to the gears. The steering shaft is rotatable from a centered position in response to steering torque. A centering mechanism imparts a counter-torque on the cluster of gears to restore the steering shaft to the centered position when steering torque is released. The gear cluster comprises two drive gears that accurately guide the steering shaft to the centered position under the influence of the centering mechanism. The gear cluster is configured to minimize and compensate for gear wear, permitting accurate and consistent centering of the main shaft each time a steering torque is released.

12 Claims, 5 Drawing Sheets

SELF-CENTERING STEERING MODULE

FIELD OF THE INVENTION

The present invention relates to steering systems which accurately and consistently restore a steering control to a selected position when the control is released, and more specifically to a steering system for moving aircraft or the like on the ground in which the aircraft proceeds in a straight direction of travel upon return of the steering control to a centered position.

BACKGROUND

In the present state of the art, aircraft moving on the ground may be steered by turning the orientation of the aircraft's nose gear. A nose gear system generally consists of a handle mechanism with position transducers that provides handle position information to the control system that adjusts the nose gear orientation. Mechanical components of the handle mechanism are frequently subject to wear after an extended period of use. Mechanical wear may affect performance of steering systems, especially where components are designed with strict tolerances. In particular, mechanical wear, lost motion and gear backlash (i.e. the amount of play between gear teeth) may disrupt the engagement between the steering control and the nosewheel, resulting in inaccurate nosewheel control and drifting from an intended course.

SUMMARY OF THE INVENTION

The present invention provides an improved steering system. The steering system includes a main steering shaft operable from a centered or neutral position and rotatable in response to a steering force or torque applied to a handwheel mounted on the main shaft. The main shaft cooperates with a cluster of gears, such as spur gears, and a centering mechanism. The gears rotate in response to a steering force, or torque, applied to the main shaft, and the centering mechanism imparts an opposing force, or counter-torque, on the gears to return the main shaft to the original centered position when the steering force is released from the handwheel. The counter-torque is supplied by a biasing element that biases the main shaft toward the centered position so that the aircraft automatically returns to a straight course when the handwheel is released.

The present invention may be used in conjunction with a rotational variable differential transformer (RVDT) or other position-sensitive transducer. When the handwheel is turned, the RVDT monitors rotational displacement of the main shaft and converts the shaft's angular position to an electrical signal. The signal is sent to the aircraft's navigational system which changes the orientation of the nosewheel in accordance with the orientation of the main shaft. After the handwheel is turned and released, the centering mechanism imparts a counter-torque on the spur gears to return the main shaft and handwheel to the centered position. The RVDT monitors the rotational change in the main shaft and sends a corresponding signal to the aircraft's navigational system to reorient the nosewheel to a centered position so that the aircraft travels in a straight line.

The present steering system returns the main shaft to its centered position accurately and consistently each time the handwheel is released. This ensures that the RVDT reads the proper orientation for centering the nosewheel. The steering system is configured to compensate for mechanical limitations, such as gear wear and gear backlash. In particular, the gears are engaged in a unified or integrated cluster, substantially preventing any gear from slipping or moving independently relative to the other gears. The spur gears are maintained in positive engagement with one another by constant loads caused by handwheel rotation and counteracting loads from the centering, mechanism. Meshed gear teeth contact surfaces do not disengage from one another when the steering direction is changed from one direction to the opposite direction. As a result, gear backlash and gear wear are minimized, allowing the centering mechanism to accurately and consistently restore the main shaft to the centered position.

The integrated gears are engaged with one another directly or indirectly, such that the gears rotate and change direction simultaneously as loads on the main shaft change. The gears are engaged at multiple interfaces within the gear cluster, minimizing the effects of wear that may occur at one location. Therefore, worn areas on an individual gear do not disrupt or affect steering accuracy or cause gear slippage. The constant engagement between gears, and the arrangement of gears as a unified integrated gear cluster, compensates for any wear and other mechanical limitations that may be present.

DESCRIPTION OF THE DRAWINGS

The foregoing summary, as well as the following description, will be better understood when read in conjunction with the figures, in which.

DETAILED DESCRIPTION

Figure 1:
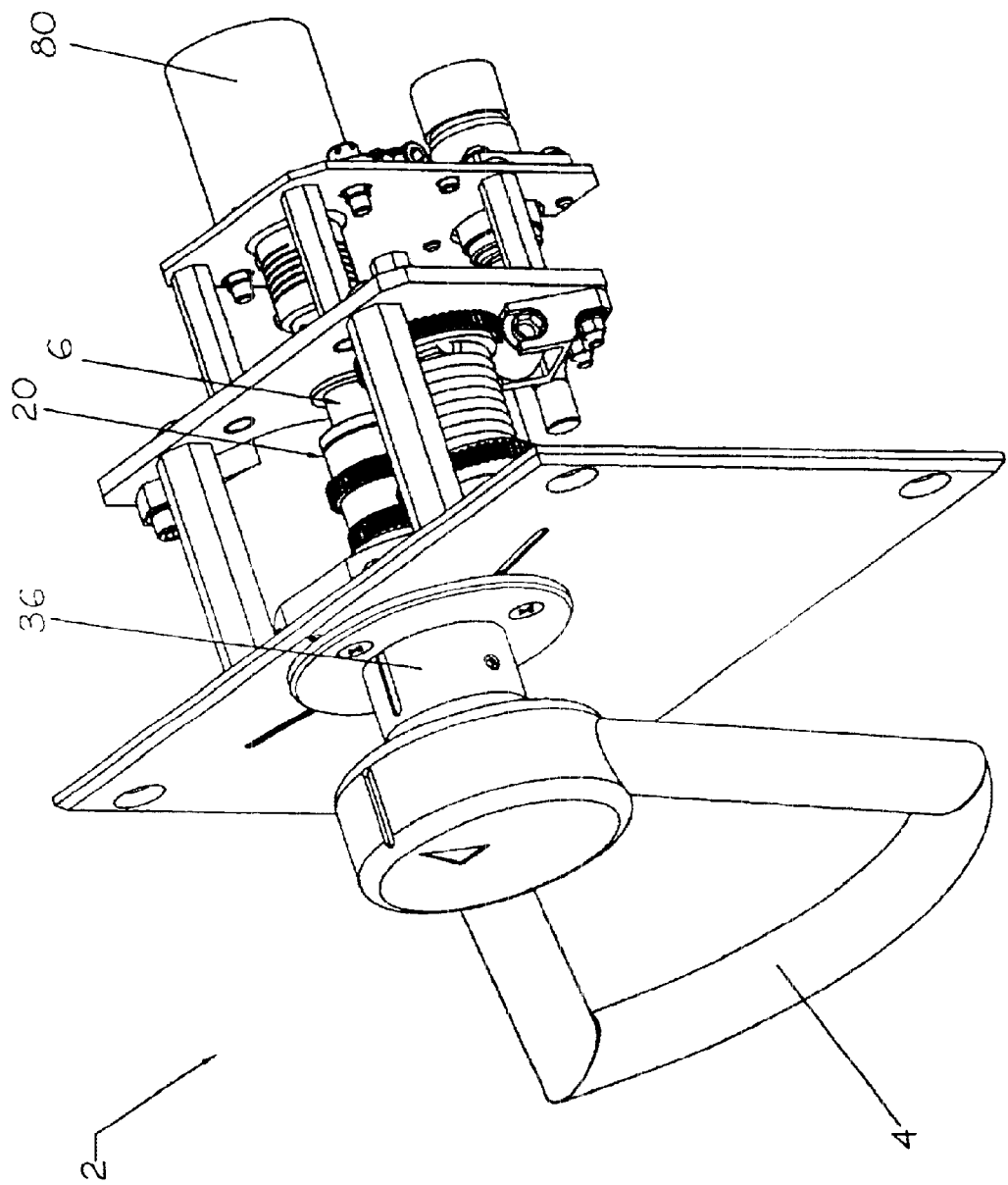
FIG. 1 is an isometric view of a steering module for use in aircraft or the like, in accordance with the present invention.

Referring to FIGS. 1–5 in general, and to FIG. 1 specifically, a steering module is shown and generally designated as 2. The steering module 2 and its component parts may be used in a variety of steering applications, including steering applications where a self-centering feature is desired. For example, for purposes of this description, the steering module 2 will be described and illustrated as used in an aircraft's nosewheel steering system. However, the present invention is also applicable to non-aircraft steering systems, such as other vehicle steering systems, including those that benefit from steer-by-wire. Steer-by-wire systems are beneficial when remote or multiple steering locations are dequired, such as construction or dual-steer refuse vehicle, for example. In addition, the present invention is applicable to any system that requires bi-directional manual input, such as to a lever, handle, or wheel, that also requires automatic rotation to a neutral position when the manual input is removed. For example, game controllers and process controls may also make use of the present invention.

Returning to FIG. 1, the steering module 2 comprises a handwheel 4 that is rotatable to control the orientation of a nosewheel on the aircraft while the aircraft is taxiing on the ground. The handwheel 4 is operable from a zero degree (0°) or centered position to steer the aircraft in a straight line. Handwheel 4 is linked in rotational engagement with a centering mechanism 6 which is operable to return the handwheel to the centered position after a steering force is applied and released from the handwheel.

Figure 2:
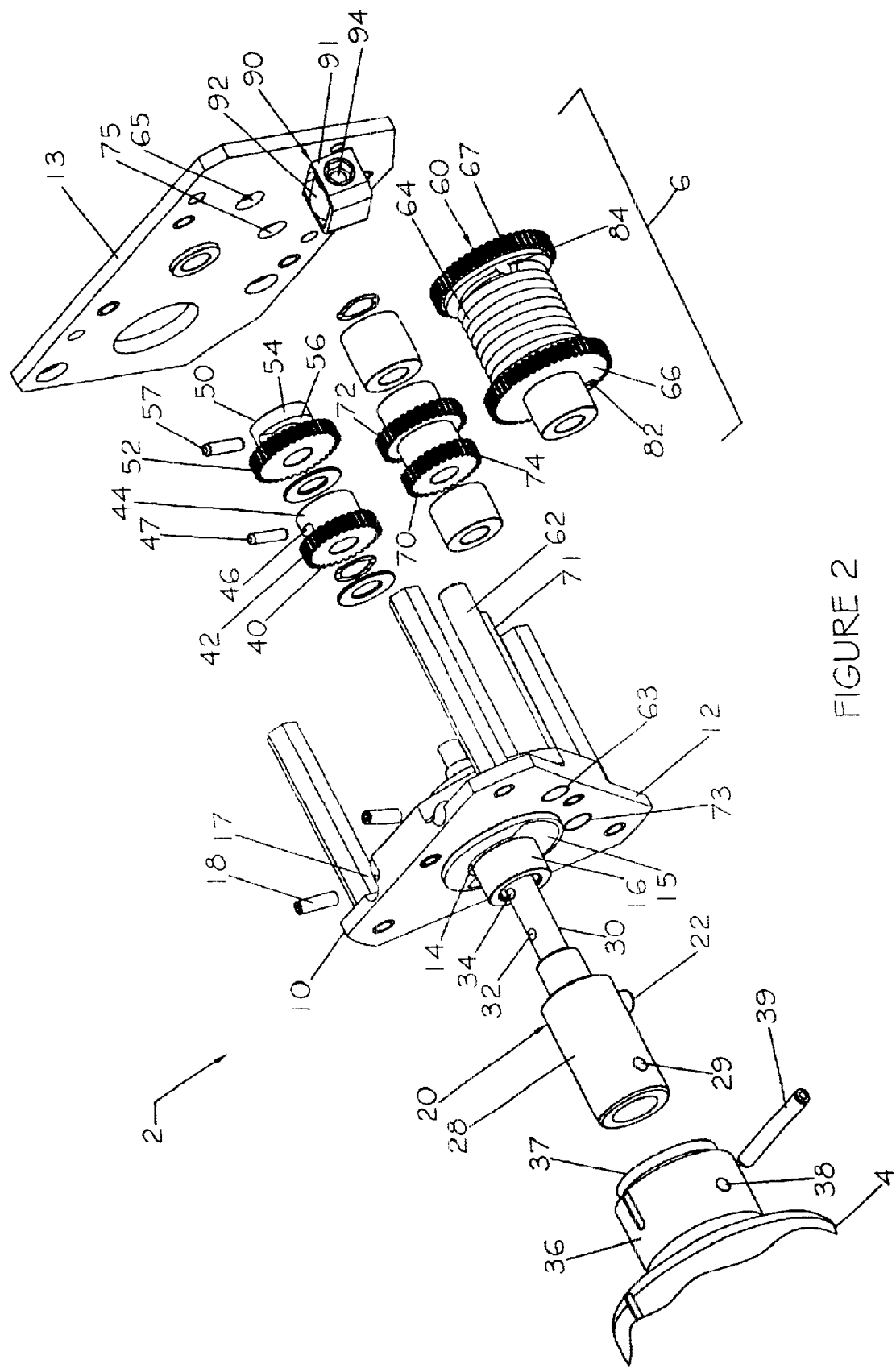
FIG. 2 is a fragmented exploded isometric view of the steering module in FIG. 1 illustrating component parts of the steering module.

Referring to FIGS. 1–2, the handwheel 4 is mounted on a main shaft assembly 20, which is configured to rotate with the handwheel. The centering mechanism 6 is disposed in rotational engagement with the main shaft assembly 20 and is configured to impart a centering or restoring force on the main shaft assembly to bias the handwheel 4 toward the centered position. The main shaft assembly 20 engages a position sensing transducer 80, which is configured to monitor the orientation of the main shaft assembly and convert the rotational position to an electrical signal. The signal instructs the aircraft's electrical system to reposition the nosewheel in accordance with the orientation of the main shaft assembly and handwheel 4.

The centering mechanism 6 is configured to precisely return the main shaft assembly 20 and handwheel 4 to the centered position each time a steering force is released from the handwheel. As such, the centering mechanism is operable to consistently provide a centered position reading on the transducer 80 when the handwheel 4 is released, sending an accurate signal to the aircraft to steer the nosewheel in a straight orientation.

Figure 3:
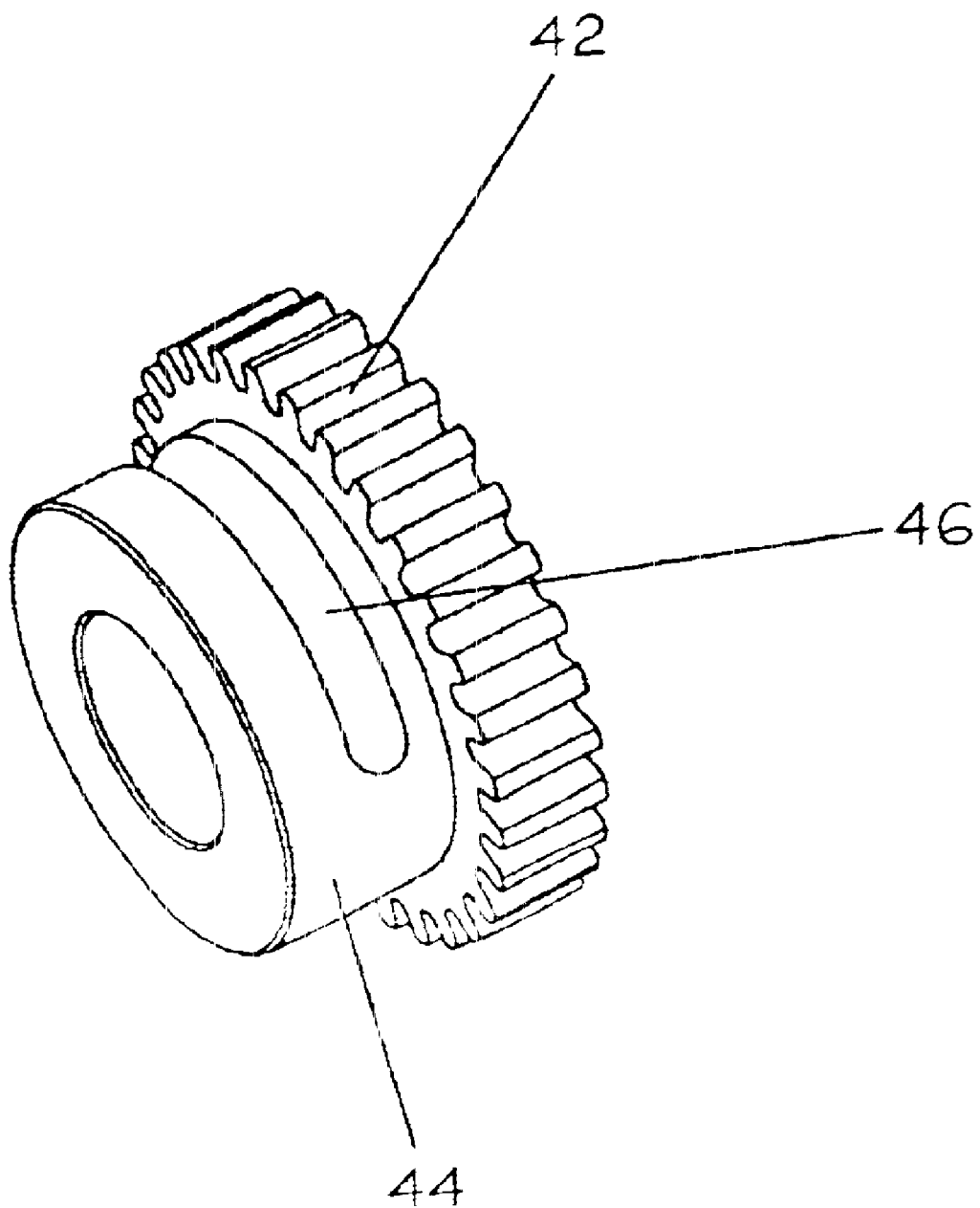
FIG. 3 is an enlarged isometric view of a drive gear used in the steering module of FIG. 1.

Referring now to FIGS. 1–3, the nosewheel steering module 2 will be described in greater detail. The centering mechanism 6 is disposed in a housing assembly 10 which comprises a housing base 12 and housing cover 13. The housing base 12 comprises a generally centrally located aperture 14 adapted to receive the main shaft assembly 20. In particular, the main shaft assembly 20 is mounted through a bearing 16 mounted in the aperture 14. Bearing 16 may be a needle roller bearing or other component configured to allow rotational displacement of the main shaft assembly 20 through the housing base 12.

Figure 6:
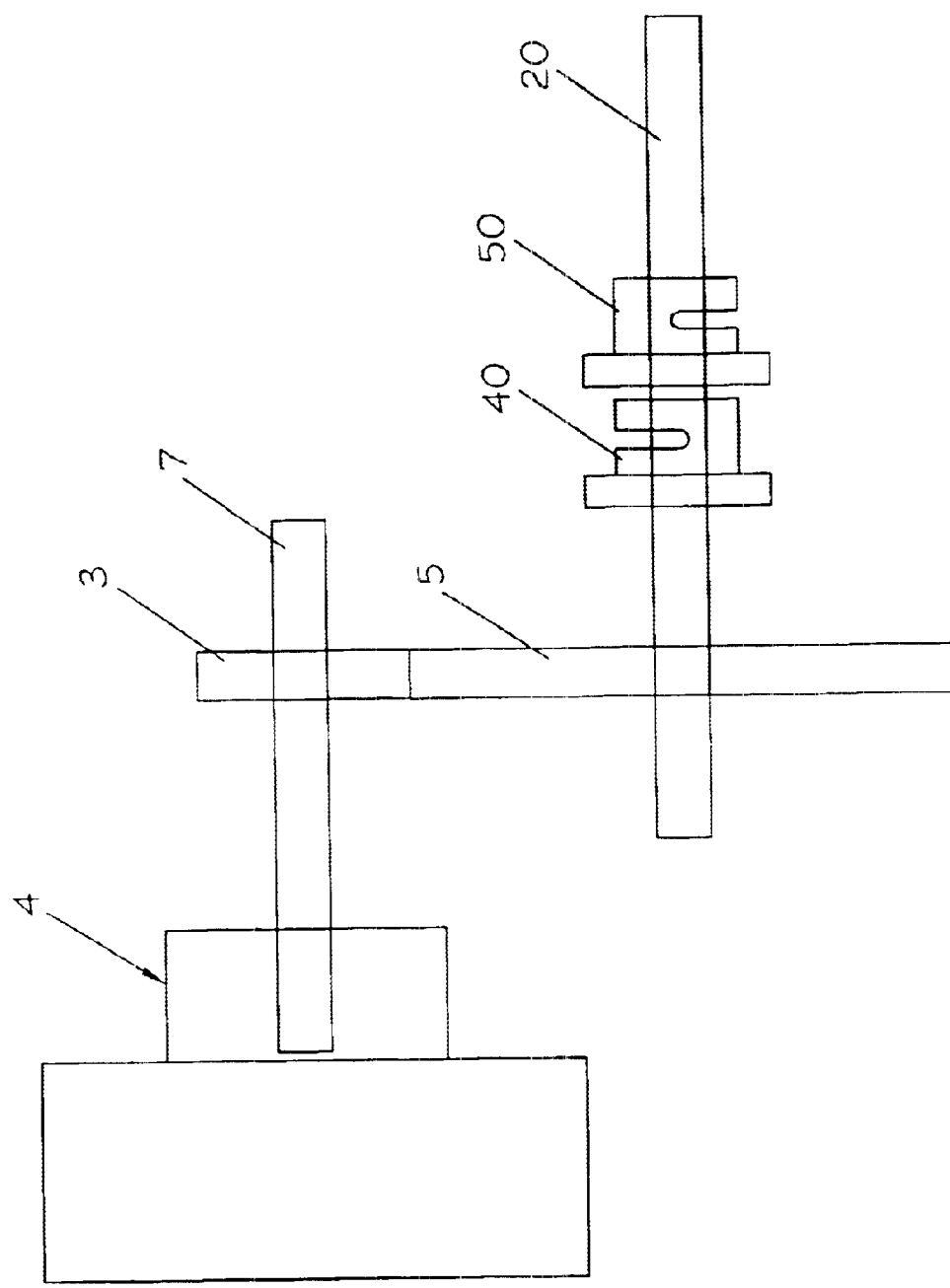
FIG. 6 is a schematic side elevational view of an alternative configuration of the handle and main shaft.

The handwheel 4 and main shaft 20 are configured for rotational displacement between an extreme counterclockwise position and an extreme clockwise position. Preferably, the handwheel is operable through an angular rotation of up to 150° in either direction from the neutral position. Handle rotation beyond 150° in each direction can be achieved by offsetting the handle 4 from the main shaft 20 and adding gearing to reduce main shaft 20 rotation in relation to handle 4 rotation, as shown in FIG. 6. The handle 4 is mounted to a handle shaft 7 which is oriented generally parallel to the main shaft 20. An upper steering gear 3 is mounted on the handle shaft 7 so that the upper gear 3 rotates in unison with rotation of the handle shaft 7. A lower steering gear 5 is mounted on the main shaft 20 so that the lower gear 5 rotates in unison with rotation of the main shaft 20. The lower steering gear 5 is located on the main shaft 20 at a position so as to mesh or engage with the upper steering gear 3 to couple rotational motion of the handle 4 to the main shaft 20. An anti-backlash gear can be incorporated into the upper or lower steering gear 3, 5 to eliminate the backlash increase from adding these gears.

The angular rotation of the handwheel 4 and main shaft 20 may be limited using a variety of structural arrangements. For instance, the main shaft 20 may have a stop pin 22, as shown in FIG. 2, that rotates in unison with the main shaft 20. A pair of set screws 18 are inserted in the housing base 12 and extend into the rotational path of the stop pin to engage the stop pin as it rotates. In this way, the range of angular rotation of the main shaft 20 and hand wheel 4 are limited by the set screws 18.

In FIG. 2, the stop pin 22 is shown press fitted into the exterior of main shaft 20. The aperture 14 in the housing base 12 comprises a semi-circular channel 15 adapted to receive the stop pin 22 and permit rotation of the stop pin within the aperture as the main shaft 20 is rotated in the aperture. The housing base 12 comprises a pair of bores 17 that extend from a top face of the housing base and extend down through the base where they connect with the aperture 14. Each bore 17 is adapted to receive one of the threaded set screws 18 such that an end of each set screw protrudes into the interior of the aperture 14. The bores 17 are threaded to engage with the threading on the set screws 18. As such, the set screws 18 are displaceable within the bores 17 in response to torsional adjustment. The set screws 18 are configured for insertion through the bores 17 and into the interior of aperture 14, where the screws engage the stop pin 22 to limit rotation of the main shaft 20 and handwheel 4. The limits of handwheel rotation are adjustable by adjusting the position of the set screws 18 within the bores 17 and the aperture 14. In particular, the range of handwheel rotation may be decreased by adjusting the screws 18 so that the screws extend farther into the aperture 14. Similarly, the range of handwheel rotation may be increased by adjusting the screws so that the screws do not extend as far into the aperture 14. If adjustable stops are not required, then the adjusting screws 18 may be removed and the ends of the aperture will serve as the end stops.

The main shaft assembly 20 is configured to connect the handwheel 4 to the centering mechanism 6 and transfer torque between the handwheel and centering mechanism. The main shaft assembly 20 comprises an enlarged diameter section 28 configured for connection with the handwheel. The handwheel 4 is connected to a cylindrical column 36 having a bore 37 adapted to receive the enlarged diameter section 28 of main shaft 20. The enlarged diameter section 28 of main shaft 20 is secured within the column 36 on handwheel 4 using any of several mounting methods. For instance, in FIG. 2, the enlarged diameter section 28 is shown having a pin hole 29 configured to align with a pin hole 38 on the wheel column 36 when the enlarged diameter section is inserted into the bore 37 in the wheel column. A pin 39 is configured for insertion through aligned holes 29,38 to secure the handwheel 4 to the main shaft 20 such that the handwheel and main shaft are integrally connected and rotatable in unison.

The main shaft assembly 20 further comprises a reduced diameter section 30 configured to translate torque from the handwheel 4 to the centering mechanism 6. Centering mechanism 6 comprises an upper drive gear assembly 40 which translates torque applied to the main shaft 20 in a clockwise direction, and a lower drive gear assembly 50 which translates torque applied to the main shaft in a counterclockwise direction. The upper drive gear assembly 40 comprises a drive gear 42 which includes a cylinderical hub 44 and a slot 46 in the hub 44. Similarly, the lower drive gear assembly 50 comprises a drive gear 52 which includes a cylinderical hub 54 and a slot 56 in the hub 54. Components of the upper and lower drive gear assemblies each have cylindrical bores configured to align coaxially with one another. Once aligned, the bores are configured to receive the reduced diameter section 30 of the main shaft 20.

Torque applied to the main shaft 20 is translated to the upper and lower drive gear assemblies 40,50 by a pair of pin connections. In particular, a first pin hole 32 is machined through the main shaft 20, and a second pin hole 34 is machined through the main shaft 20 and is aligned longitudinally and radially with the first pin slot. An elongated radial slot 46 is formed through the upper drive gear hub 44 and generally extends through an obtuse angle on one side of the hub 44, as seen best in FIG. 3. Similarly, the lower drive gear hub 54 has an elongated radial slot 56 that generally extends through an obtuse angle on one side of the hub 54. The length of radial slots 46,56 control the available rotation of the centering mechanism 6 and may be selected to permit a desired range of gear rotation. Radial slot 56 has a length generally equal to the length of radial slot 46 to permit synchronized rotation and centering of the drive gears 42,52, as will be explained in more detail below.

The slots 46,56 are configured to align radially with first and second pin holes 32,34, respectively, when the upper and lower drive gear assemblies 40,50 are disposed on main shaft 20. An upper drive pin 47 extends through radial slot 46 in upper drive gear hub 44 and into the first pin hole 32 to fix the longitudinal position of the upper drive gear assembly relative to the main shaft 20. Similarly, a lower drive pin 57 extends through radial slot 56 in lower drive gear hub 54 and into the second pin hole 34 to fix the longitudinal position of the lower drive gear assembly relative to the main shaft 20. The upper and lower drive pins 47,57 may be connected to the main shaft 20 by press fitting the pins into holes 32,34, respectively. Upper and lower drive pins 47,57 are configured to rotate integrally with main shaft 20 in response to torque applied to the handwheel 4 and the main shaft.

The components of the centering mechanism 6 will now be described as they would appear when the handwheel 4 is disposed in the centered position. To better illustrate the orientation of each gear, the centering mechanism 6 will be described using the exploded drawing in FIG. 2. FIG. 2 shows the orientation of each component as it would appear when the handwheel is in the centered position. Radial channels 46,56 extend on opposing sides of the main shaft 20. The drive pins 47,57 are disposed at ends in channels 46,56 and are configured to transfer torque between the main shaft 20 and drive gear assemblies 40,50, respectively. More specifically, upper drive pin 47 is positioned so as to abut against an end of channel 46 in the clockwise direction such that clockwise rotation of the upper drive pin rotates the upper drive gear 42 and hub 44 in the clockwise direction. Lower drive pin 57 is positioned so as to abut against an end of slot 56 in the counterclockwise direction such that counterclockwise rotation of the lower drive pin rotates the lower drive gear 52 and hub 54 in the counterclockwise direction.

The radial slots 46,56 allow separate rotation and counter-rotation of the upper and lower drive gears 42,52, respectively. More specifically, radial slot 46 is adapted to allow upper drive pin 47 to rotate counterclockwise within the slot 46 during counterclockwise rotation of the main shaft 20, such that the upper drive pin 47 does not impart counterclockwise torque on the upper drive gear hub 44 and thus upper drive gear 42. In other words, pin 47 rides in slot 46 rather than turning the upper gear 42 during counterclockwise rotation of the main shaft 20.

Likewise, radial slot 56 is adapted to allow lower drive pin 57 to rotate clockwise within the slot 56 during clockwise rotation of the main shaft 20, such that the lower drive pin 57 does not impart clockwise torque on the lower drive gear hub 54 and thus lower drive gear 52. In other words, pin 57 rides in slot 56 rather than turning the lower drive gear 52 during clockwise rotation of the main shaft 20. The upper and lower drive gear hubs 44,54 slidably engage the reduced diameter section 30 of main shaft 20. As such, upper drive gear 44 and hub 42 rotate freely relative to main shaft 20 when counterclockwise torque is applied to the main shaft 20, and lower drive gear 54 and hub gear 52 rotate freely relative to the main shaft 20 when clockwise torque is applied to the main shaft 20.

A biasing gear assembly 60 is disposed on a biasing gear axle 62 in proximity to the main shaft 20. The biasing gear assembly 60 is configured to restore the main shaft 20 and handwheel 4 to the centered position by imparting a restoring force or counter-torque on the drive gear assemblies 40,50. The biasing gear axle 62 is supported by the housing 10 and is configured to rotate freely within the housing 10. More specifically, a pair of coaxial apertures 63,65 disposed in the housing base 12 and housing cover plate 13, respectively, are adapted to receive the ends of biasing gear axle 62 and support the axle 62 in a position generally parallel to the main shaft 20. Biasing gear assembly 60 comprises a biasing gear 66 and a biasing element 64 configured to exert a restoring force through the biasing gear 66.

The biasing gear assembly 60 can be formed using a number of different configurations. In addition, biasing element 64 may be any type of energy storing component, such as a spring or a piston. In FIG. 1, the biasing gear assembly 60 is shown mounted on axle 62 generally parallel to the main shaft 20. The restoring force is provided by a torsion spring 64 which circumscribes the axle 62. The torsion spring 64 is preferably comprised of a resilient non-corrosive material, such as a steel alloy. One end of the torsion spring 64 is fixed to the biasing gear 66, and the opposite end of the torsion spring is fixed to a stationary gear 67 which is maintained in a fixed position.

The biasing gear 66 is configured to twist or wind up the torsion spring 64 when the handwheel 4 is turned. More specifically, the biasing gear 66 cooperates directly or indirectly with the upper and lower drive gear assemblies 40,50 and rotates in response to rotational displacement of the upper and lower drive gears 42,52 when torque is applied to the main shaft 20. One end 82 of the torsion spring 64 engages the biasing gear 66 and rotates integrally with the biasing gear. The other end 84 of the torsion spring 64 engages the stationary gear 67 so as to remain generally fixed relative to the first end 82. As such, the torsion spring 64 is configured to wind radially in response to torque transferred to the biasing gear 66 and the first end 82 of the spring from the upper and lower drive gear assemblies 40, 50. The torsion spring 64 is operable to supply a counteracting force or counter-torque capable of reversing the upper and lower drive gears 42,52 and restoring the main shaft 20 and handwheel 4 to the centered position. More specifically, the resilient property of the torsion spring 64 is sufficient to reverse the rotation of the biasing gear 66 and apply a counter-torque to the upper and lower drive gear assemblies 40,50 to return the main shaft 20 to the centered position.

Referring again to FIGS. 1 and 2, the configuration of the drive gear assemblies 40,50 and biasing gear assembly 60 will be described in more detail. The upper drive gear 42 is longitudinally positioned on the main shaft 20 so as to mesh or engage with the biasing gear 66 on the biasing gear axle 62. The torsion spring 64 is configured to apply a preload or bias force on the biasing gear 66 and upper drive gear 42 to urge the main shaft 20 into the centered position. The biasing gear 66 is configured to rotate in the counterclockwise direction in response to torque transferred from the upper drive gear assembly 40.

The torsion spring 64 may be a standard close-wound torsion spring configured for winding in one direction. More specifically, the torsion spring 64 may be configured to wind up only in response to counterclockwise rotation of the biasing gear 66. When the upper drive gear 42 is rotated in the clockwise direction, the direct engagement between the upper drive gear and the biasing gear 66 causes the biasing gear to rotate in the counterclockwise direction to wind up the torsion spring 64. A direct engagement between the lower drive gear 52 and the biasing gear 66 would cause the biasing gear 66 to rotate in the clockwise direction, not the counterclockwise direction. Therefore, a mechanism is provided to reverse the direction of torque imparted by counterclockwise rotation of the lower drive gear 52.

In FIG. 2, an idler gear assembly 70 is shown generally parallel with the centering mechanism 6. The idler gear assembly 70 is operable to reverse the direction of torque imparted by the lower drive gear 52 and transfer torque to the biasing gear 66 such that the biasing gear 66 rotates counterclockwise to wind up the torsion spring 64. The idler gear assembly 70 comprises an axle 71 that is supported by the housing, similar to the biasing gear axle 62. A pair of coaxial apertures 73,75 disposed in the housing base 12 and housing cover plate 13, respectively, are adapted to receive the ends of idler gear axle 71 and support the axle 71 in a position generally parallel to the main shaft 20. A first idler gear 72 is mounted on axle 71 and meshes with the lower drive gear 52. The first idler gear 72 is configured to rotate clockwise in response to counterclockwise rotation of the lower drive gear 52 during counterclockwise rotation of the main shaft 20. A second idler gear 74 is mounted on the idler axle 71 coaxially with and longitudinally offset from the first idler gear 72. The idler gears 74, 72 are of one piece or mechanically joined as by brazing or similar process so that both rotate together freely about axle 71. As such, the second idler gear 74 rotates clockwise in response to clockwise rotation of the first idler gear 72. The second idler gear 74 is further configured to transfer torque to the biasing gear assembly 60 to wind up the torsion spring 64 when the main shaft 20 is rotated counterclockwise. More specifically, the second idler gear 74 rotatably engages the biasing gear 66 such that clockwise rotation of idler gears 72, 74 imparts torque on the biasing gear 66 to rotate the biasing gear 66 in the counterclockwise direction.

Figure 4:
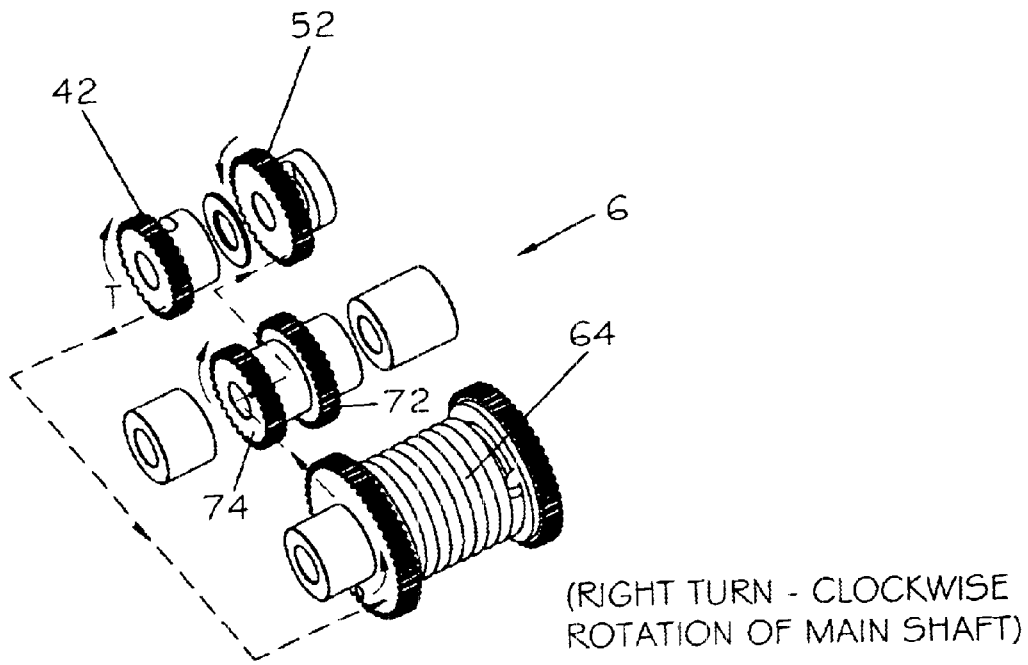
FIG. 4 is an enlarged exploded isometric view of the gears used in the steering module of FIG. 1, illustrating torque distribution during a right turn.
Figure 5:
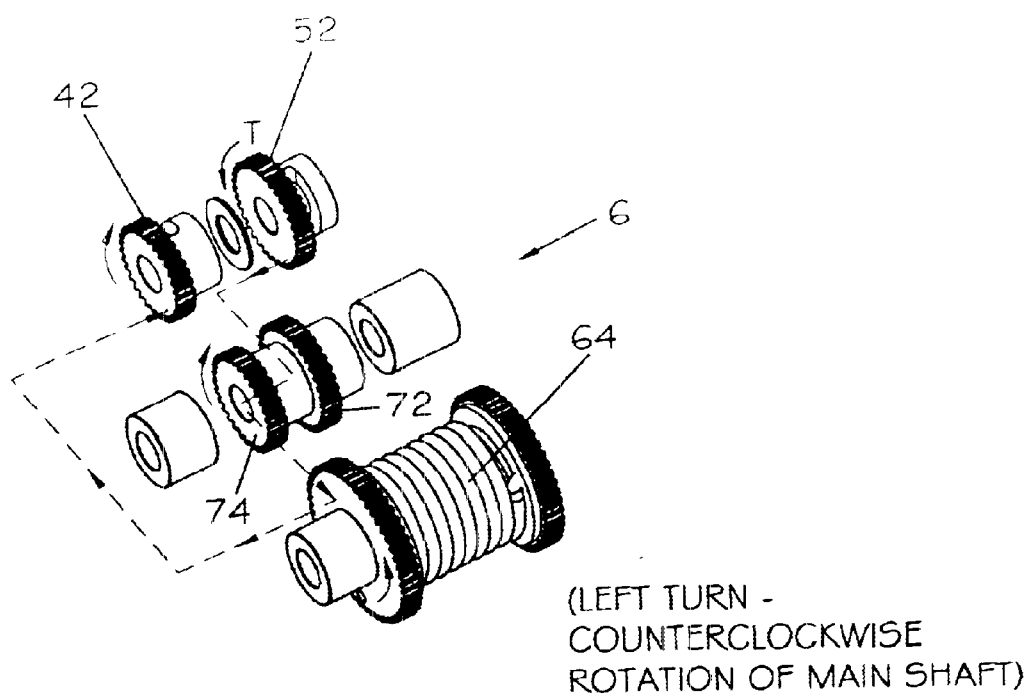
FIG. 5 is an enlarged exploded isometric view of the gears used in the steering module of FIG. 1, illustrating torque distribution during left turn.

Based on the foregoing, the centering mechanism 6 is configured such that biasing gear 66 rotates counterclockwise in response to either clockwise rotation or counterclockwise rotation of the main shaft 20. The cooperation between the individual gears is illustrated visually in FIGS. 4 and 5. FIG. 4 illustrates the cooperation of the gears when the handwheel 4 is turned from the centered position to the right; i.e. when the main shaft 20 is rotated clockwise. FIG. 5 illustrates the cooperation of gears when the handwheel 4 is turned from the centered position to the left; i.e. when the main shaft 20 is rotated counterclockwise. The letter "T" in each Figure represents the torque transferred from the main shaft 20 to the drive gear being loaded. The dashed lines and arrow heads represent the path in which torque is transferred throughout the centering mechanism 6. The curved arrows represent the direction of rotation of the individual gears.

Referring to FIG. 4, a clockwise torque "T" applied to upper drive gear 42 acts directly on the biasing gear 66 and causes the biasing gear 66 to rotate counterclockwise to wind up the torsion spring 64. The biasing gear 66 engages the second idler gear 74 and causes the first and second idler gears 72, 74 to rotate clockwise. The first idler gear 72 causes the lower drive gear 52 to rotate counterclockwise.

Referring to FIG. 5, a counterclockwise torque "T" applied to the lower drive gear 52 is reversed through the idler gear assembly prior to reaching the biasing gear 66. More specifically, the counterclockwise torque causes the first and second idler gears 72,74 to rotate clockwise. The second idler gear 74 causes the biasing gear 66 to rotate counterclockwise to wind up the torsion spring 64. It should be apparent from FIGS. 4 and 5 that the drive gears 42, 52, idler gears 72, 74, and biasing gear 66 are configured to rotate in the same direction regardless of the direction of torque applied to the handwheel 4 and main shaft 20. Therefore, steering force applied to the handwheel 4 from the centered position loads the gears in the same direction, regardless of the direction of steering.

As stated earlier, the centering mechanism 6 is configured to restore the main shaft 20 to the centered position when steering force is released from handwheel 4. The biasing gear assembly 60 is configured to engage the upper drive gear assembly 40 and idler gear assembly 70 and impart a counter-torque that reverses the rotation of the upper drive gear 42 and lower drive gear 52. Therefore, the biasing gear assembly 60 is operable to impart rotation of the various gears in directions that are reverse to those shown in FIGS. 4 and 5.

The torsion spring 64 is capable of providing torque greater than the minimum torque required to restore the main shaft 20 to the centered position after steering force is released from the handwheel 4. That is, the design torque exceeds the minimum torque required to overcome mechanical limitations such as friction losses between the drive gear hubs 44,54 and the main shaft 20. The excess design torque retains handwheel 4 in the centered position and resists shimmy or movement, as explained below. A design torque that is fifteen percent (15%) greater than the minimum required torque is sufficient to restore and stabilize the main shaft 20 in the centered position.

The radial slots 46,56 are configured to engage the drive pins 47,57 in an opposing manner to return the main shaft 20 to the centered position. In particular, the biasing gear assembly 60 is configured to rotate the upper drive gear 42 counterclockwise such that an end wall of upper radial slot 46 imparts a counterclockwise torque load on upper drive pin 47. Similarly, the biasing gear assembly 60 is configured to rotate the lower drive gear 52 clockwise such that an end wall of lower radial slot 56 imparts a clockwise torque load on lower drive pin 57. The upper and lower drive gear hubs 44,54 are positioned relative to drive pins 47,57 such that the pins are loaded in opposite directions when the main shaft 20 is restored to the centered position. More specifically, the upper drive pin 47 engages the end of the upper gear slot 46 and the lower drive pin engages the end of the lower gear slot 56 at the point that the main shaft 20 is restored to the centered position. The synchronized loading on the upper and lower drive pins 47,57 in opposite directions provides a "hard stop" effect on the main shaft 20 that releasably retains the handwheel 4 in the centered position. As stated above, the adjusted torque of the torsion spring 64 is greater than the minimum torque required to return the main shaft 20 to the centered position. However, the main shaft 20 is prevented from rotating clockwise or counterclockwise past the centered position by the equal and opposite loads on the drive pins 47,57. The equal and opposite loading return the shaft to the centered position without appreciable drift.

The centering mechanism 6 is configured to compensate for wear on mechanical components. In this way, wear that occurs on an individual gear does not affect the accuracy of the centering mechanism 6 and the resulting input to the RVDT. The various gears in the centering mechanism 6 are under constant load in one direction by steering forces, and under constant load in the opposite direction by the torsion spring 64. The constant loading on the gears maintains engagement between cooperating gear teeth. The various gears are configured to connect at various points of engagement and rotate simultaneously. Therefore, the gears do not disengage by virtue of the constant load from steering forces and from the torsion spring 64, and independent motion of any one gear apart from the other gears is substantially prevented. The multiple points of engagement between gears, and the integrated arrangement that controls motion of all the gears at one time, minimizes the effects that a damaged gear tooth could have on the rest of the centering mechanism. As a result, the centering mechanism minimizes wear of mechanical components that may occur over an extended period of time.

The design torque of the torsion spring 64 can be selected to restore the main shaft 20 at various rates of return. The speed at which the torsion spring 64 restores the main shaft 20 and handwheel 4 to the centered position may affect the operational feel of the steering module 2. Frequently, a dampened or slowed rate of return is desirable to avoid excessive "jerk" in the handwheel 4 when the handwheel 4 is released. Therefore, a dampener may be provided to control the handwheel return rate and improve the operational feel of the steering module 2. For instance, a viscous dampener may be mounted on a shaft adjacent to the main shaft 20 and cooperatively engage a gear on the main shaft 20 to control the rate at which the main shaft 20 is restored to the centered position. The damper could also be a dynamically controlled unit that would change the return rate and force, to rotate the wheel based on electrical input from the vehicle control system.

If desired, a mechanism is provided to adjust the amount of pre-load or bending resistance in the torsion spring 64. In FIG. 2, a torsion spring adjuster 90 is shown mounted in proximity to the biasing gear assembly 60. The spring adjuster 90 comprises a bracket 91 and a set screw 92 disposed within the bracket. The set screw 92 is configured to adjust the degree of initial angular deflection in the torsion spring 64 by adjusting the orientation of the stationary gear 67 and second end of the torsion spring 64. More specifically, the set screw 92 has a plurality of threads that are configured to rotatably engage the stationary gear 67. The set screw 92 engages the stationary gear 67 at an angle perpendicular to the biasing gear axle 62. The head of the set screw 92 comprises a hex fitting 94 and is operable to rotate the set screw 92 within the bracket 91. The threads on the set screw 92 cooperatively engage the gear teeth on the stationary gear 67 so as to impart a rotational force on the stationary gear 67 when the set screw 92 is rotated. The stationary gear 67 is configured to rotate through a small angle of rotation in response to rotational adjustment of the hex fitting. As such, rotational adjustment of the stationary gear 67 alters the position of the second end of the spring 64 relative to the first end, which changes the available bending stress and bias force in the spring 64. The hex fitting 94 and set screw 92 may be rotated clockwise or counterclockwise using an allen wrench or other suitable implement to increase or decrease the bending resistance and bias force in the spring 64.

Operation of the nosewheel steering module 2 will now be described. The handwheel 4 is initially maintained in the centered position by the torsion spring 64, as stated earlier. That is, the torsion spring 64 imparts torque through the centering mechanism 6 which exerts a load on the upper drive pin 47 and an equal and opposite load on the lower drive pin 57. The opposing loads on the drive pins 47,57 maintain the main shaft 20 in the zero position and produce moderate resistance to rotational displacement out of the zero position. To overcome the resistance produced by the torsion spring 64, a minimal steering force, or "breakout force", is applied to the handwheel 4 to steer the handwheel 4 out of the centered position. To turn the nosewheel right, the breakout force is applied to the handwheel 4 in the clockwise direction. To turn the nosewheel left, the breakout force is applied to the handwheel 4 in the counterclockwise direction.

For purposes of this description, the described operation will begin with a right turning of the nosewheel. The handwheel 4 is rotated clockwise from the centered position by applying a clockwise breakout force. Torque is produced on the handwheel column 36 and transferred to the enlarged diameter section 28 of the main shaft 20 through the pin connection 39. Torque is further transferred to the reduced diameter section 30 of the main shaft 20 and the upper drive pin 47. As the main shaft 20 rotates in the clockwise direction, the RVDT reads the change in angular position of the main shaft 20 and sends an electrical signal to the aircraft's navigational system to rotate the nosewheel to a corresponding position to the right.

As the main shaft 20 rotates clockwise, the upper drive pin 47 contacts the end of the radial channel 46 and drives the cylinder 44 and upper drive gear 42 clockwise. As the upper drive gear 42 rotates clockwise, the engagement between the upper drive gear 42 and biasing gear 66 causes the biasing gear 66 to rotate in the counterclockwise direction, as illustrated in FIG. 4. The first end 82 of torsion spring 64 rotates counterclockwise with the biasing gear 66 and deflects through a counterclockwise angle of rotation relative to the second end 84 of the spring 64, which remains stationary. As the first end 82 deflects relative to the second end 84, the spring 64 is wound up on the biasing gear assembly 60.

As the biasing gear 66 rotates counterclockwise, the engagement between the biasing gear and the second idler gear 74 causes the second idler gear 74 to rotate clockwise. Torque on the second idler gear 74 is transferred to the first idler gear 72, causing the first idler gear 72 to rotate clockwise. Clockwise rotation of the first idler gear 72, in turn, rotates the lower drive gear 52. At the same time, the lower drive pin 57 rotates clockwise within the lower gear radial channel 56. Clockwise rotation of the handwheel 4 continues in response to a clockwise steering force until the stop pin 22 on main shaft 20 engages one of the set screws 18 in the housing base aperture 14. At this point, the handwheel is disposed in the extreme clockwise position, and further clockwise rotation of the handwheel is prevented by the engagement between the stop pin 22 and the set screw 18. The channel 56 is sufficiently long so that the lower drive pin 57 moves freely through the channel during clockwise rotation of the main shaft 20 and does not contact the end of the channel as the handwheel 4 is rotated toward the extreme clockwise position.

To steer the nosewheel back towards the centered position, clockwise rotation of the handwheel is ceased, and a counterclockwise torque may be applied to the handwheel 4. As the direction of applied torque is reversed, the cooperating gears in the centering mechanism 6 remain positively engaged under load from the torsion spring 64, without lost motion or gear slippage. The directions of rotation of the various gears are reversed at the same time. Counterclockwise torque on the handwheel 4 produces a counterclockwise rotation of the main shaft 20. The RVDT reads the change in angular position of the main shaft and sends an electrical signal to the aircraft's navigational system to rotate the nosewheel to a corresponding position to the left. As the handwheel 4 is turned back toward the centered position, the torque applied to the handwheel 4 is aided by the bias from the torsion spring 64.

After the handwheel 4 reaches the centered position, additional counterclockwise torque on the handwheel 4 rotates the nosewheel left of the centered position, directing the aircraft in a left turning pattern. At this point, torque applied to the handwheel 4 works against the bias of the torsion spring 64, as in the scenario when the handwheel 4 is turned to the right from the centered position. Therefore, a counterclockwise breakout force must be applied to the handwheel 4 to turn the nosewheel to the left from the centered position. Counterclockwise torque on the handwheel 4 is transferred to the enlarged diameter section 28 of the main shaft 20 through the pin connection 39. Torque is further transferred to the reduced diameter section 30 of the main shaft 20 and the lower drive pin 57. As the main shaft 20 rotates in the counterclockwise direction, the RVDT reads the change in angular position of the main shaft 20 and sends an electrical signal to the aircraft's navigational system to rotate the nosewheel to a corresponding position to the left.

Rotating the main shaft 20 counterclockwise drives the lower drive pin 57 against the end of the radial slot 56, thereby rotating the hub 54 and lower drive gear 52 counterclockwise. As the lower drive gear 52 rotates counterclockwise, the engagement between the lower drive gear 52 and first idler gear 72 causes the first idler gear 72 to rotate in the clockwise direction, as illustrated in FIG. 5. The clockwise torque in the first idler gear 72 is transferred to the second idler gear 74, thereby rotating the biasing gear 66 counterclockwise. As in the right turn scenario, the counterclockwise rotation of the biasing gear 66 winds up the torsion spring 64.

As the biasing gear 66 rotates counterclockwise, the direct engagement between the biasing gear and the upper drive gear 42 causes the upper drive gear 42 to rotate clockwise. At the same time, the upper drive pin 47 rotates counterclockwise within the upper gear radial slot 46, in response to the counterclockwise torque on the main shaft 20. Counterclockwise rotation of the handwheel 4 continues until the stop pin 22 on main shaft 20 engages a set screw 18 in the housing base aperture 14. At this point, the handwheel is disposed in the extreme counterclockwise position, and further counterclockwise rotation is prevented by the engagement between the stop pin 22 and one of the set screws 18. The slot 46 is sufficiently long so that, as the handwheel 4 is rotated toward the extreme counterclockwise position, the upper drive pin 47 moves freely through the channel during counterclockwise rotation of the main shaft 20 and the upper drive pin 47 does not contact the end of the channel.

Release of steering force from the handwheel 4 returns the main shaft 20 to the centered position, at which point the aircraft is directed from a left turning pattern to a straight line. More specifically, when steering force is released from the handwheel 4, the bias force of the torsion spring 64 is no longer overcome, and the torsion spring 64 is free to unwind and release stored energy to the biasing gear 66. As the spring 64 unwinds, the stored energy in the spring 64 deflects the first end 82 of the spring through a clockwise angle and causes the biasing gear 66 to rotate clockwise. Clockwise rotation of the biasing gear 66 imparts a counterclockwise rotation on the first drive gear 42 and the second idler gear 74. Counterclockwise rotation of the second idler gear 74, in turn, imparts counterclockwise torque and rotation on the first idler gear 72 also.

Having facilitated a left turning pattern, the main shaft 20 is disposed in the counterclockwise direction with the lower drive pin 57 engaging an end of the radial slot 56. Counterclockwise rotation of the first idler gear 72 rotates the lower drive gear 52 and hub 54 clockwise. As a result, the end of radial slot 56 engages the lower drive pin 57 and rotates the lower drive pin 57 clockwise. Clockwise rotation of the lower drive pin 57 rotates the main shaft 20 and upper drive pin 47 in the clockwise direction. At the same time, the upper drive gear 42 rotates counterclockwise in response to rotation of the biasing gear 66. The upper drive pin 47 meets an end of the upper radial slot 46, stopping further rotation of the main shaft 20. At this point, the main shaft 20 is disposed in the centered position and is retained in equilibrium by the opposing forces imposed on the upper and lower drive pins 47,57. The angular orientation of the main shaft 20 is read by the RVDT 80, and a signal is sent to the aircraft's navigational system to turn the nosewheel accordingly. More specifically, the centered position of the main shaft 20 provides a centered reading on the RVDT, and the RVDT sends a signal to the navigational system to turn the nosewheel in a straight line orientation.

The terms and expressions which have been employed are used as terms of description and not of limitation. There is no intention in the use of such terms and expressions of excluding any equivalents of the features shown and described or portions thereof. It is recognized, therefore, that various modifications are possible within the scope and spirit of the invention. For example, the references to clockwise and counterclockwise orientations in the foregoing description and drawings are intended to illustrate one embodiment of the present invention, and are not intended to represent the only configuration that is contemplated for the present invention. The replacement of clockwise references with counterclockwise references in the foregoing description and drawings, and vice versa, may be done without changing the spirit of the invention. Accordingly, the invention incorporates variations that fall within the scope of the following claims.

We claim:

1. An apparatus for steering a nosewheel on an aircraft, or the like, while the aircraft is on the ground, said apparatus comprising:
    a main shaft rotatable in response to a torque applied by an operator, said shaft being rotatable to control the orientation of the nosewheel and operable in a centered position to direct the nosewheel in a straight line;
    a first drive gear and a second drive gear slidably engaging the main shaft;
    an idler gear assembly disposed in rotational engagement with the second drive gear; and
    a centering mechanism operable to bias the main shaft toward the centered position and restore the main shaft to the centered position when the operator releases torque from the main shaft.

2. The apparatus of claim 1 wherein the idler gear assembly comprises:
    an idler shaft generally parallel to the main shaft;
    a first idler gear circumferentially disposed on the idler shaft and aligned in rotational engagement with the centering mechanism; and
    a second idler gear circumferentially disposed on the idler shaft and aligned in rotational engagement with the second drive gear, said first idler gear and said second idler gear being fixed to each other so as to rotate in unison and translate rotational forces to and from the centering mechanism and the second drive gear.

3. The apparatus of claim 2 wherein the centering mechanism comprises:
- a centering shaft generally parallel to the main shaft;
- a centering gear circumferentially disposed on the centering shaft and aligned in rotational engagement with the first drive gear and the first idler gear so as to rotate in response to rotation of either the first drive gear or the second drive gear; and
- a biasing element engaging the centering gear and configured to transfer torque to the first drive gear and the first idler gear to bias the main shaft toward the centered position and restore the main shaft to the centered position when the operator releases torque from the main shaft.

4. The apparatus of claim 3 wherein the biasing element comprises a resilient torsion spring circumferentially disposed on the centering shaft and configured to wind to a stressed condition when a steering force is applied to the main shaft and configured to unwind to a relatively unstressed condition when the operator releases torque from the main shaft, said torsion spring imparting a restoring force on the main shaft as the spring unwinds to restore the main shaft to the centered position.

5. An apparatus for steering a nosewheel on an aircraft, or the like, while the aircraft is on the ground, said apparatus comprising:
- a main shaft rotatable in response to a torque applied by an operator, said shaft being rotatable to control the orientation of the nosewheel and operable in a centered position to direct the nosewheel in a straight line;
- a first drive gear and a second drive gear slidably engaging the main shaft;
- an idler gear assembly disposed in rotational engagement with the second drive gear;
- a centering mechanism operable to bias the main shaft toward the centered position and restore the main shaft to the centered position when the operator releases torque from the main shaft; and
- a position-sensitive transducer connected to the main shaft and operable to measure rotational displacement of the main shaft.

6. The apparatus of claim 5 wherein the idler gear assembly comprises:
- an idler shaft generally parallel to the main shaft;
- a first idler gear circumferentially disposed on the idler shaft and aligned in rotational engagement with the centering mechanism; and
- a second idler gear circumferentially disposed on the idler shaft and aligned in rotational engagement with the second drive gear, said first idler gear and said second idler gear being fixed to the idler shaft so as to rotate in unison with the idler shaft and translate rotational forces to and from the centering mechanism and the second drive gear.

7. The apparatus of claim 6 wherein the centering mechanism comprises:
- a centering shaft generally parallel to the main shaft;
- a centering gear circumferentially disposed on the centering shaft and aligned in rotational engagement with the first drive gear and the first idler gear so as to rotate in response to rotation of either the first drive gear or the second drive gear; and
- a biasing element engaging the centering gear and configured to transfer torque to the first drive gear and the first idler gear to bias the main shaft toward the centered position and restore the main shaft to the centered position when the operator releases torque from the main shaft.

8. The apparatus of claim 7 wherein the biasing element comprises a resilient torsion spring circumferentially disposed on the centering shaft and configured to wind to a stressed condition when a steering force is applied to the main shaft and configured to unwind to a relatively unstressed condition when the operator releases torque from the main shaft, said torsion spring imparting a restoring force on the main shaft as the spring unwinds to restore the main shaft to the centered position.

9. The apparatus of claim 5 wherein the position-sensitive transducer is a rotational variable differential transformer.

10. A method for constructing a centering mechanism used in an aircraft steering module, or the like, said method comprising the steps of:
- attaching a steering handle to one end of a steering shaft;
- rotating the steering handle and steering shaft such that the steering handle and steering shaft are oriented in a centered position;
- mounting a first drive gear in rotational engagement with the steering shaft in the centered position, such that rotation of the first drive gear in a first direction rotates the steering shaft in the first direction;
- mounting a second drive gear in rotational engagement with the steering shaft in the centered position, such that rotation of the second drive gear in a second direction rotates the steering shaft in the second direction;
- mounting a cluster of cooperating gears in rotational engagement with the first drive gear and the second drive gear such that rotation of one gear is operable to rotate all gears; and
- applying a biasing force to the cluster of gears to urge and maintain the first drive gear, the second drive gear and the steering shaft toward the centered position.

11. A method for constructing a centering mechanism used in an aircraft steering module, or the like, said method comprising the steps of:
- attaching a steering handle to one end of a steering shaft oriented in a centered position;
- mounting a first drive gear in rotational engagement with the steering shaft, such that rotation of the first drive gear in a first direction of rotation rotates the steering shaft in the first direction of rotation;
- mounting a second drive gear in rotational engagement with the steering shaft in the centered position, such that rotation of the second drive gear in a second direction of rotation rotates the steering shaft in the second direction of rotation, said second direction of rotation being opposite to the first direction of rotation;
- applying a torque on the first drive gear from a biasing element to bias the first drive gear in the second direction of rotation, and simultaneously applying an equal and opposite torque on the second drive gear to bias the second drive gear in the first direction of rotation.

12. A method for centering a steering shaft and retaining the steering shaft in a centered position, comprising the steps of:
- attaching a first contact and a second contact to a steering shaft oriented in a centered position, such that the first and second contacts rotate in unison with the steering shaft;

mounting a biasing element in cooperative engagement with the steering shaft, said biasing element configured to apply a clockwise torque to the first contact sufficient to rotate the steering shaft clockwise and out of the centered position;

mounting a reversing element in cooperative engagement with the steering shaft and the biasing element, said reversing element configured to receive clockwise torque from the biasing element and transfer counterclockwise torque to the second contact sufficient to rotate the steering shaft counterclockwise out of the centered position; and mounting a collar over the first contact and the second contact to limit rotation of the first contact and second contact past the centered position in response to the biasing element, such that the steering shaft is retained in the centered position.

* * * * *